UNITED STATES PATENT OFFICE.

WALLACE A. BEATTY, OF NEW YORK, N. Y., ASSIGNOR, BY DIRECT AND MESNE ASSIGNMENTS, TO GEORGE W. BEADLE, OF NEW YORK, N. Y.

PLASTIC COMPOUND AND PROCESS OF MAKING SAME.

1,158,960.  Specification of Letters Patent.  Patented Nov. 2, 1915.

No Drawing. Application filed April 30, 1912, Serial No. 694,273. Renewed March 5, 1913. Serial No. 752,252.

*To all whom it may concern:*

Be it known that I, WALLACE A. BEATTY, a citizen of the United States, residing at New York, in the county of New York and State of New York, have invented certain new and useful Improvements in Plastic Compounds and Processes of Making Same, of which the following is a specification.

The present invention relates to a compound for and method of producing plastics and consists in the steps of procedure, combinations, arrangements, and proportions of elements hereinafter disclosed and set forth in the claims.

The invention has for its especial purpose to produce a substance resembling celluloid adapted for all purposes for which the present known celluloid is used, but omitting its characteristic of inflammability, and which is without odor.

More particularly the invention consists of a substance resembling celluloid compounded from cellulose acetate and a condensate of acetone or its homologues with phenol or its homologues. A specific example comprises cellulose acetate and dioxy-diphenyl-dimethyl-methane dissolved in a common solvent, for instance, alcohol or chloroform. In the illustration given, the proportions are about 75 parts of cellulose acetate and 25 parts dioxy-diphenyl-dimethyl-methane, and such quantity of solvent such as those above mentioned as will give the desired consistency, depending upon the degree of viscosity or hardness of product desired, as, for instance, the different degrees used in the coating of photographic films or manufacture of solid articles. This dioxy-diphenyl-dimethyl-methane may be prepared as a condensation product by mixing phenol with acetone, as disclosed in my co-pending application No. 702,046 filed June 6, 1912, and entitled Artificial gum and process for making the same. The invention further contemplates the use of dioxy-diphenyl-dimethyl-methane partially replaced by another substance, and in all cases the solution is evaporated to a mass of the desired consistency.

The foregoing sets forth succinctly the components of the plastic and the method of producing same, but it will be understood, however, that slight variation therefrom may be made without departing from the spirit of the invention.

What I claim as new is:

1. The process of producing a plastic compound consisting in uniting cellulose acetate with dioxy-diphenyl-dimethyl-methane in the presence of a suitable solvent, and then evaporating the mass to the desired consistency, substantially as described.

2. A plastic composition essentially comprising cellulose acetate and dioxy-diphenyl-dimethyl-methane, substantially as described.

3. A plastic composition comprising essentially cellulose acetate, dioxy-diphenyl-dimethyl-methane and alcohol, substantially as described.

4. A plastic composition comprising cellulose acetate, dioxy-diphenyl-dimethyl-methane and a suitable solvent, substantially as described.

5. A plastic composition comprising cellulose acetate and a condensation product of a ketone with a hydroxy derivative of an aromatic hydrocarbon, and a suitable solvent, substantially as described.

In testimony whereof I affix my signature in presence of two witnesses.

WALLACE A. BEATTY.

Witnesses:
H. H. BYRNE,
CHAS. E. BRECKONS.